(12) United States Patent
Suzuki et al.

(10) Patent No.: US 12,700,808 B2
(45) Date of Patent: Aug. 4, 2026

(54) POWER CONVERTER AND POWER SUPPLY APPARATUS

(71) Applicant: Mitsubishi Electric Corporation, Tokyo (JP)

(72) Inventors: Hidenori Suzuki, Tokyo (JP); Ryotaro Harada, Tokyo (JP); Yoshinobu Koji, Hyogo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 190 days.

(21) Appl. No.: 18/566,341

(22) PCT Filed: Jun. 4, 2021

(86) PCT No.: PCT/JP2021/021424
§ 371 (c)(1),
(2) Date: Dec. 1, 2023

(87) PCT Pub. No.: WO2022/254711
PCT Pub. Date: Dec. 8, 2022

(65) Prior Publication Data
US 2024/0258929 A1 Aug. 1, 2024

(51) Int. Cl.
*H02M 3/335* (2006.01)
*H02M 1/00* (2006.01)
(Continued)

(52) U.S. Cl.
CPC ..... *H02M 3/33584* (2013.01); *H02M 1/0009* (2021.05); *H02M 1/0054* (2021.05);
(Continued)

(58) Field of Classification Search
CPC ........... H02M 3/33584; H02M 1/0009; H02M 1/0054; H02M 1/0058; H02M 3/28; Y02B 70/10
See application file for complete search history.

(56) References Cited

U.S. PATENT DOCUMENTS 6,329,785 B1 * 12/2001 Starkie ................... H02P 25/04
318/599
6,349,044 B1 * 2/2002 Canales-Abarca ..... H02M 1/34
363/56.08
(Continued)

FOREIGN PATENT DOCUMENTS

JP 2009-176263 A 8/2009
JP 2012-186942 A 9/2012
(Continued)

OTHER PUBLICATIONS

International Search Report (PCT/ISA/210) with English translation and Written Opinion (PCT/ISA/237) mailed on Aug. 3, 2021, by the Japanese Patent Office as the International Searching Authority for International Application No. PCT/JP2021/021424.
(Continued)

*Primary Examiner* — Yusef A Ahmed
(74) *Attorney, Agent, or Firm* — BUCHANAN, INGERSOLL & ROONEY PC

(57) ABSTRACT

A power converter includes an inverter circuit, a variable reactor, a transformer, and a converter circuit. The inverter circuit includes a plurality of switching elements and snubber capacitors each connected in parallel to a corresponding one of the switching elements, and converts a first DC voltage into a first AC voltage. The variable reactor is disposed on the output side of the inverter circuit and configured to be variable in inductance value. The transformer insulates the primary side and the secondary side from each other, and converts the first AC voltage applied via the variable reactor into a second AC voltage. The converter circuit converts the second AC voltage into a second DC voltage.

5 Claims, 8 Drawing Sheets

(51) Int. Cl.
    *H02M 3/28*         (2006.01)
    *H02M 7/487*      (2007.01)

(52) U.S. Cl.
    CPC ........... *H02M 1/0058* (2021.05); *H02M 3/28*
          (2013.01); *H02M 7/487* (2013.01)

(56)         References Cited

U.S. PATENT DOCUMENTS

| | | | |
|---|---|---|---|
| 6,353,547 B1 * | 3/2002 | Jang | H02M 3/33571 363/16 |
| 7,061,777 B2 * | 6/2006 | Zeng | H02M 3/33569 363/25 |
| 8,269,141 B2 * | 9/2012 | Daniel | B23K 9/09 219/130.1 |
| 8,787,042 B2 * | 7/2014 | Nozaki | H02M 3/3378 363/53 |
| 9,178,420 B1 * | 11/2015 | Hawley | H02M 3/158 |
| 9,729,070 B2 * | 8/2017 | Liu | H02M 3/3376 |
| 9,954,453 B1 * | 4/2018 | Ishino | H02M 1/08 |
| 10,749,441 B1 * | 8/2020 | Singh | H02M 3/33584 |
| 11,201,549 B2 * | 12/2021 | Zhang | H02M 7/483 |
| 11,611,283 B2 * | 3/2023 | Hirokawa | H02M 3/33592 |
| 11,799,373 B2 * | 10/2023 | Yuzurihara | H02M 1/342 |
| 11,863,136 B2 * | 1/2024 | Zhang | H03F 3/2176 |
| 2002/0050829 A1 * | 5/2002 | Xu | H01F 29/02 324/654 |
| 2002/0054498 A1 * | 5/2002 | Cho | H02M 3/3376 363/132 |
| 2003/0052658 A1 * | 3/2003 | Baretich | H02M 5/293 323/284 |
| 2006/0050537 A1 * | 3/2006 | Zeng | H02M 3/33571 363/16 |
| 2010/0265741 A1 * | 10/2010 | Usui | H02M 1/4241 363/21.12 |
| 2011/0051465 A1 * | 3/2011 | Usui | H02M 3/33571 363/21.02 |
| 2011/0216557 A1 * | 9/2011 | Fujiyoshi | H02M 7/538 363/21.09 |
| 2012/0201064 A1 * | 8/2012 | Asakura | H02M 3/155 363/98 |
| 2013/0100707 A1 * | 4/2013 | Hatakeyama | H02M 3/3376 363/17 |
| 2013/0181532 A1 * | 7/2013 | KJ R | H02M 7/5387 307/82 |
| 2013/0301304 A1 * | 11/2013 | Murakami | H02M 3/33507 363/17 |
| 2014/0028092 A1 * | 1/2014 | Takeshima | H02M 3/33507 363/16 |
| 2014/0191568 A1 * | 7/2014 | Partovi | H02M 3/33576 307/31 |
| 2015/0015181 A1 * | 1/2015 | Kondo | H02M 3/33584 320/103 |
| 2015/0084422 A1 * | 3/2015 | Ishigaki | H02M 7/4837 307/43 |
| 2015/0124487 A1 * | 5/2015 | Fu | H02M 3/015 363/17 |
| 2015/0381063 A1 * | 12/2015 | Takahara | H02M 3/3376 363/17 |
| 2016/0013657 A1 * | 1/2016 | Jeong | H02J 50/402 307/104 |
| 2016/0079866 A1 * | 3/2016 | Mizushima | H02M 3/3376 363/17 |
| 2016/0099649 A1 * | 4/2016 | Hara | B60L 53/20 363/17 |
| 2016/0172982 A1 * | 6/2016 | Yamaoka | H01F 21/00 363/21.03 |
| 2016/0254702 A1 * | 9/2016 | Akuzawa | H02M 7/48 307/104 |
| 2017/0011842 A1 * | 1/2017 | Ishigaki | H01F 27/38 |
| 2017/0187285 A1 * | 6/2017 | Kim | H02M 3/158 |
| 2017/0331385 A1 * | 11/2017 | Hayase | H02M 3/28 |
| 2018/0294681 A1 * | 10/2018 | Bae | H02J 50/70 |
| 2018/0301997 A1 * | 10/2018 | Lee | H02M 3/33553 |
| 2018/0350513 A1 * | 12/2018 | Murakami | H01F 37/00 |
| 2019/0214916 A1 * | 7/2019 | Takahara | H02M 3/33573 |
| 2020/0412248 A1 * | 12/2020 | Onozaki | H02M 3/158 |
| 2021/0036618 A1 * | 2/2021 | Lambert | G01R 19/16538 |
| 2021/0135582 A1 * | 5/2021 | Dutta | H02M 3/33576 |
| 2021/0272735 A1 | 9/2021 | Aikawa | |
| 2022/0278625 A1 * | 9/2022 | Hirota | H02M 1/0058 |
| 2023/0284354 A1 * | 9/2023 | Hui | H05B 45/10 315/307 |
| 2023/0291300 A1 * | 9/2023 | Bae | H02M 3/33576 |
| 2023/0307918 A1 * | 9/2023 | Ginart | H02M 3/33573 |
| 2024/0030804 A1 * | 1/2024 | Nishimoto | H02M 1/15 |
| 2025/0175087 A1 * | 5/2025 | Chan | H02M 3/33569 |

FOREIGN PATENT DOCUMENTS

| | | |
|---|---|---|
| JP | 2013188015 A | 9/2013 |
| JP | 2014103725 A | 6/2014 |
| JP | 2018082572 A | 5/2018 |
| WO | 2006/098376 A1 | 9/2006 |
| WO | 2020031644 A1 | 2/2020 |

OTHER PUBLICATIONS

Notice of Reasons for Refusal issued in corresponding JP Application No. 2023-525327 dated Oct. 24, 2023.

Notice of Reasons for Refusal dated Feb. 6, 2024, issued in the corresponding Japanese Patent Application No. 2023-525327, 6 pages including 3 pages of English Translation.

Examination Report dated Dec. 23, 2025, issued in the corresponding Indian Patent Application No. 202327081924. (6 pages).

\* cited by examiner

POWER CONVERTER AND POWER SUPPLY APPARATUS

FIELD

The present disclosure relates to a power converter for converting power supply voltage applied from a DC power supply, into DC voltage to a DC load, and a power supply apparatus.

BACKGROUND

Patent Literature 1 below discloses a three-level DC-DC converter employing a so-called zero-voltage and zero-current switching scheme that switches a switching element with zero voltage and current across the switching element. Patent Literature 1 discloses a simply configured three-level power converter including a main circuit having a bidirectional switch and soft switching capacitors added thereto without using an auxiliary circuit including a high-with-stand-voltage switching element, a saturation reactor, etc. That converter controls switching elements such that the switching elements are turned on/off, thereby enabling zero-voltage and zero-current switching operation. To expand a soft switching region, it is necessary to increase the inductance value of an inductor or a reactor involved in power transfer, the details of which will be described later.

CITATION LIST

Patent Literature

Patent Literature 1: Japanese Patent Application Laid-open No. 2014-103725

SUMMARY OF INVENTION

Problem to be Solved by the Invention

For the technique of Patent Literature 1, the inductance value used at the time of power transfer is a fixed value because the leakage inductance of an isolation transformer is used. For this reason, an improvement in power conversion efficiency is not necessarily sufficient.

The present disclosure has been made in view of the above. It is an object of the present disclosure to provide a power converter that further improves the power conversion efficiency.

Means to Solve the Problem

To solve the above-described problem and achieve the object, a power converter according to the present disclosure is a power converter to convert a first DC voltage applied from a DC power supply into a second DC voltage for a load. The power converter comprises: an inverter circuit; a variable reactor, a transformer; and a converter circuit. The inverter circuit includes a plurality of switching elements and snubber capacitors each connected in parallel to a corresponding one of the switching elements, and converts the first DC voltage into a first AC voltage. The variable reactor is disposed on an output side of the inverter circuit and configured to be variable in inductance value. The transformer includes a primary winding and a secondary winding that are magnetically coupled to each other to insulate a primary side and a secondary side from each other, and converts the first AC voltage applied via the variable reactor, into a second AC voltage. The converter circuit converts the second AC voltage into the second DC voltage.

Effects of the Invention

The power converter according to the present disclosure has the effect of further improving the power conversion efficiency.

DESCRIPTION OF EMBODIMENTS

A power converter and a power supply apparatus according to an embodiment of the present disclosure will be hereinafter described in detail with reference to the accompanying drawings. In the following description, physical connection and electrical connection are simply referred to as "connection" without being distinguished from each other. That is, the term "connection" includes both a case where components are directly connected to each other, and a case where components are indirectly connected to each other via another component.

Embodiment

Figure 1:
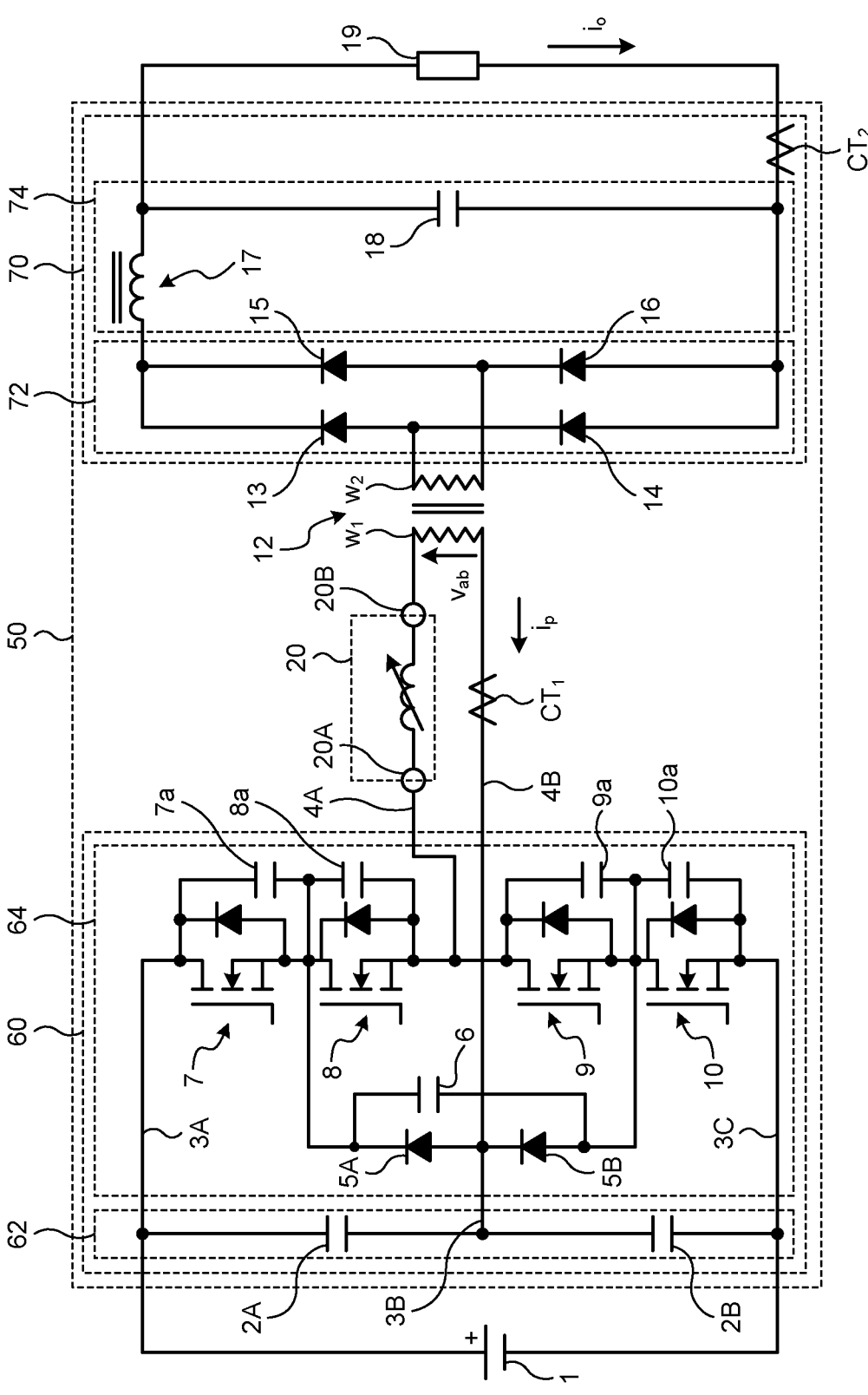
FIG. 1 is a circuit diagram illustrating an example configuration of a power converter according to an embodiment.

FIG. 1 is a circuit diagram illustrating an example configuration of a power converter 50 according to an embodiment. The power converter 50 according to the embodiment is a DC-DC converter that converts a first DC voltage into a second DC voltage for a load 19. The first DC voltage is a power supply voltage applied from a DC power supply 1. As illustrated in FIG. 1, the power converter 50 includes an inverter circuit 60, a variable reactor 20, a transformer 12, and a converter circuit 70.

The inverter circuit 60 includes an input capacitor circuit 62 and an inverter main circuit 64. The input capacitor circuit 62 holds the first DC voltage applied from the DC power supply 1. The inverter circuit 60 converts the first DC voltage into a first AC voltage.

The input capacitor circuit 62 includes filter capacitors 2A and 2B. The filter capacitor 2A and the filter capacitor 28 are connected in series to each other. One end of the filter capacitor 2A is connected to a high-potential line 3A, and the opposite end of the filter capacitor 2A is connected to an intermediate-potential line 3B. One end of the filter capacitor 2B is connected to the intermediate-potential line 3B, and the opposite end of the filter capacitor 28 is connected to a low-potential line 3C. A connection point at which the opposite end of the filter capacitor 2A and the one end of the filter capacitor 2B are connected to each other is referred to as a "midpoint" or a "neutral point". The midpoint between the filter capacitors 2A and 28 has typically zero potential in the inverter main circuit 64.

The inverter main circuit 64 includes switching elements 7, 8, 9, and 10 (hereinafter, denoted as "7 to 10" as appropriate) including anti-parallel-connected diodes. An example of the switching elements 7 to 10 is metal-oxide semiconductor field-effect transistors (MOSFETs) have the anti-parallel-connected diodes incorporated therein, as illustrated in the figure. Anti-parallel means that the anodes of the diodes are connected to the sources of the MOSFETs, and the cathodes of the diodes are connected to the drains of the MOSFETs.

Another example of the switching elements 7 to 10 is insulated-gate bipolar transistors (IGBTs). Not only silicon (Si) but also wide bandgap semiconductors such as silicon carbide (Sic), gallium nitride (GaN), gallium oxide (Ga2O3), and diamond can be used as material of the switching elements. When the switching elements are formed of a wide bandgap semiconductor material, lower losses and higher-speed switching can be achieved.

The inverter main circuit 64 includes snubber capacitors 7a, 8a, 9a, and 10a, clamp diodes 5A and 5B, and a flying capacitor 6. Each of the snubber capacitors 7a, 8a, and 10a is connected in parallel to the corresponding one of the switching elements 7 to 10. The snubber capacitors 7a, 8a, 9a, and 10a (hereinafter, denoted as "7a to 10a" as appropriate) are provided to suppress surges when the switching elements 7 to 10 cut off current. The flying capacitor 6 is provided to promote the discharge of charges accumulated in the snubber capacitors 7a to 10a.

The switching elements 7 and 8, which are connected in series to each other, define a positive arm. The switching elements 9 and 10, which are connected in series to each other in this order, define a negative arm. The switching elements 7 to 10, which are connected in series to each other in this order, define a half-bridge circuit.

One end of the switching element 7 is connected to the high-potential line 3A. The cathode of the clamp diode 5A is connected to a connection point between the opposite end of the switching element 7 and one end of the switching element 8. The anode of the clamp diode 5A is connected to the intermediate-potential line 3B. An AC wire 4A is drawn from the opposite end of the switching element 8. An AC wire 48 is drawn from the intermediate-potential line 3B.

One end of the switching element 9 is connected to the AC wire 4A. The anode of the clamp diode 5B is connected to a connection point between the opposite end of the switching element 9 and one end of the switching element 10. The cathode of the clamp diode 5B is connected to the intermediate-potential line 3B. The opposite end of the switching element 10 is connected to the low-potential line 3C.

The variable reactor 20 and the transformer 12 are disposed on the output side of the inverter circuit 60. The variable reactor 20 is a variable inductance device configured to be variable in inductance value. The variable reactor 20 includes a first terminal 20A and a second terminal 208.

The transformer 12 includes a primary winding $W_1$ and a secondary winding $W_2$ that are magnetically coupled to each other. When viewed from the transformer 12, the side of the primary winding $W_1$ is referred to as the "primary side", and the side of the secondary winding $W_2$ is referred to as the "secondary side". The transformer 12 is provided to electrically insulate the primary side and the secondary side from each other.

The variable reactor 20 has the first terminal 20A connected to the AC wire 4A, and the second terminal 20B connected to one end of the primary winding $W_1$ of the transformer 12. The opposite end of the primary winding $W_1$ is connected to the AC wire 4B. Both ends of the secondary winding $W_2$ are connected to the converter circuit 70. In FIG. 1, the variable reactor 30 is disposed on the AC wire 4A, but is not limited to this configuration. The variable reactor 20 can be disposed on the AC wire 4B.

On the primary side of the transformer 12, a current sensor $CT_1$ for detecting a transformer primary current $i_p$ flowing through the primary winding $W_1$ is provided on the AC wire 4B. The current sensor $CT_1$ can be provided on the AC wire 4A. In this description, the transformer primary current is sometimes simply referred to as a "primary current".

With this configuration, the first AC voltage is applied to the primary winding $W_1$ of the transformer 12 via the variable reactor 20, and a second AC voltage is output from the secondary winding $W_1$ of the transformer 12. That is, the transformer 12 converts, into the second AC voltage, the first AC voltage applied via the variable reactor 20 and outputs the second AC voltage to the converter circuit 70.

The converter circuit 70 includes a rectifier circuit 72 and an output filter circuit 74. The rectifier circuit 72 includes four diodes 13, 14, 15, and 16 connected in a full bridge. The rectifier circuit 72 rectifies the second AC voltage applied from the converter circuit 70, generates a DC voltage including ripple, and applies the thus generated DC voltage to the output filter circuit 74.

The output filter circuit 74 includes a smoothing reactor 17 and an output filter capacitor 18. The smoothing reactor 17 and the output filter capacitor 18 define an LC filter circuit. The output filter circuit 74 smooths the DC voltage including the ripple and applies the smoothed DC voltage to the load 19. Provided on the output side of the output filter circuit 74 is a current sensor $CT_2$ for detecting a load current $i_o$ flowing through the load 19. The load 19 is a DC load that operates on receiving DC power supply. The DC load referred to herein also includes a load 19 incorporates therein both an inverter for converting DC power into AC power, and a device for operating on receiving supply of the AC power from the inverter.

Figure 2:
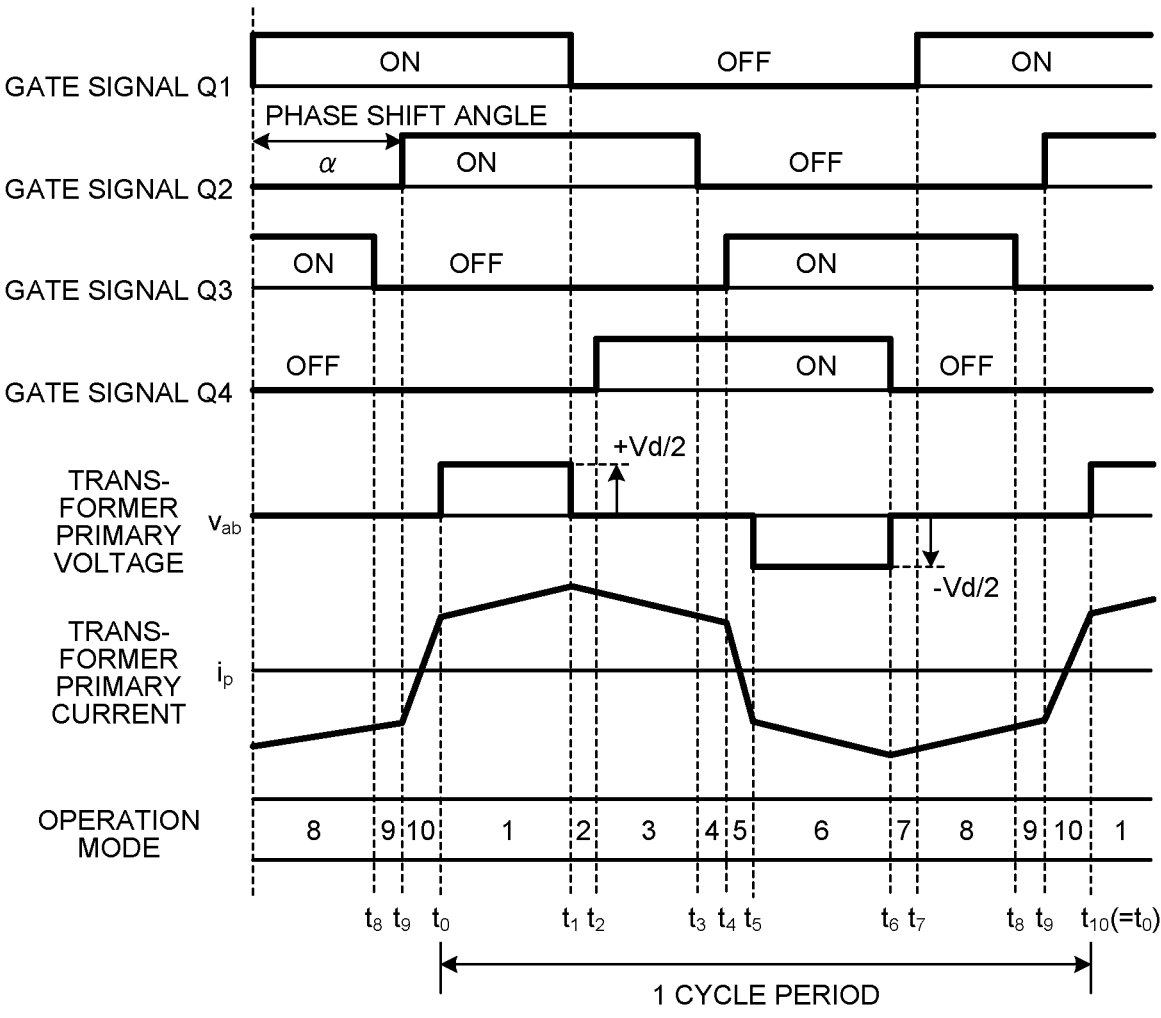
FIG. 2 is a timing chart for explaining the basic operation of an inverter circuit illustrated in FIG. 1.
Figure 3:
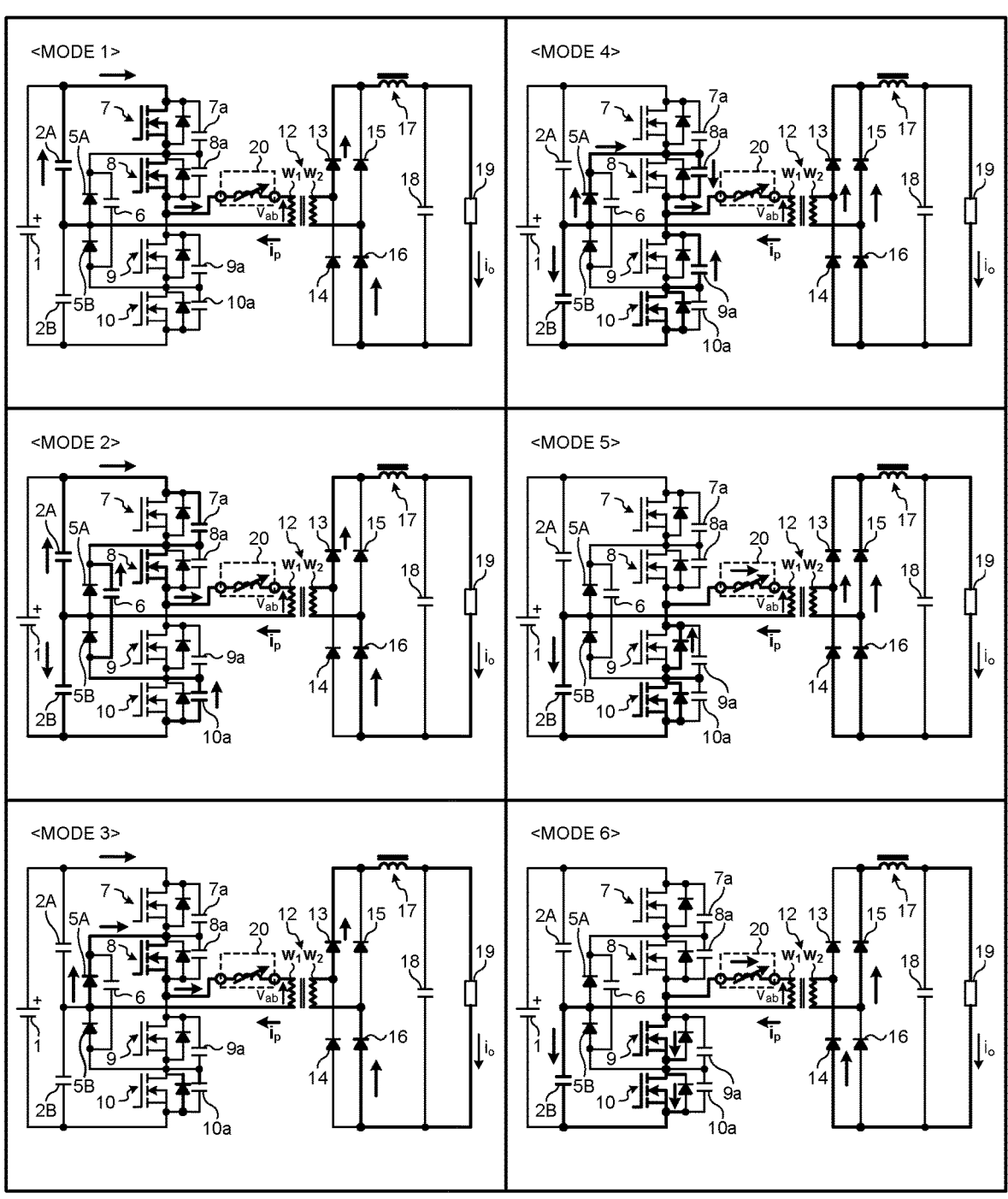
FIG. 3 is a state transition diagram for explaining the basic operation of the inverter circuit illustrated in FIG. 1.

Next, the basic operation of the inverter circuit 60 illustrated in FIG. 1 will be described with reference to FIGS. 2 and 3 in addition to FIG. 1. FIG. 2 is a timing chart for explaining the basic operation of the inverter circuit 60 illustrated in FIG. 1. FIG. 3 is a state transition diagram for explaining the basic operation of the inverter circuit 60 illustrated in FIG. 1. The following description of the basic operation is based on the assumption that the inductance $L_k$ of the variable reactor 20 is a fixed value.

The following operation of the inverter circuit 60 achieves zero-voltage soft switching (zero-voltage switching (ZVS)) or zero-voltage zero-current soft switching (zero-voltage zero-current switching (ZVECS)). ZVS and ZVECS are collectively referred to as "soft switching".

FIG. 2 illustrates, from the top row, waveforms of gate signals Q1, Q2, Q3, and Q4 (hereinafter, denoted as "Q1 to Q4" as appropriate), a transformer primary voltage $v_{ab}$, the transformer primary current $i_p$, and operation modes in this order. The gate signals Q1 to Q4 are drive signals applied to the gates of the switching elements 7 to 10, respectively. The phase difference between the gate signal Q1 and the gate signal Q2 is a physical quantity called a "phase shift angle", and is represented by "α" in FIG. 2. The phase shift angle α determines the phase at which the transformer primary current $i_p$ rises, and the magnitude of the transformer primary current $i_p$. The phase shift angle α also determines the phases of the gate signals Q2 to Q4 that are based on the gate signal Q1.

When the gate signals Q1 to Q4 are on, the corresponding switching elements 7 to 10 are in on operation. When the gate signals Q1 to Q4 are off, the corresponding switching elements 7 to 10 are in off operation.

The horizontal axis in FIG. 2 represents time. In a period during which the transformer primary current $i_p$ is positive, the inverter circuit 60 operates in mode 1 in a period from time $t_0$ to time $t_1$, operates in mode 2 in a period from time $t_1$ to time $t_2$, operates in mode 3 in a period from time $t_2$ to time $t_3$, operates in mode 4 in a period from time $t_3$ to time $t_4$, and operates in mode 5 in a period from time $t_4$ to time $t_5$. In a period during which the transformer primary current $i_p$ is negative, the inverter circuit 60 operates in mode 6 in a period from time $t_5$ to time $t_6$, operates in mode 7 in a period from time $t_6$ to time $t_7$, operates in mode 8 in a period from time $t_7$ to time $t_8$, operates in mode 9 in a period from time $t_8$ to time $t_9$, and operates in mode 10 in a period from time $t_9$ to time $t_{10}$. Thus, the inverter circuit 60 operates with modes 1 to 10 as one cycle period.

FIG. 3 illustrates the flow of current in modes 1 to 6. Portions shown in boldface are portions related to operation in each mode. The directions of current flowing during operation in each mode are indicated by arrows.

In mode 1, the switching elements 7 and 8 are turned on. As a result, the transformer primary voltage $v_{ab}$ applied to the transformer 12 becomes "+Vd/2". Vd represents the voltage value of the power supply voltage output from the DC power supply 1. The power supply voltage Vd is divided into two by the filter capacitors 2A and 2B, and thus $v_{ab}$=+Vd/2.

In mode 2, the switching element 7 is ZVS turned off. As a result, the snubber capacitor 10a is discharged through the switching element 8 and the flying capacitor 6, and the anti-parallel-connected diode of the switching element 10 comes into conduction.

In mode 3, after the anti-parallel-connected diode of the switching element 10 comes into conduction, the switching element 10 is ZVZCS turned on.

In mode 4, the switching element 8 is ZVS turned off, and the snubber capacitor 9a is discharged.

In mode 5, the anti-parallel-connected diode of the switching element 9 comes into conduction.

In mode 6, the switching element 9 is ZVECS turned on. Since the switching element 10 has been turned on in mode 3, a voltage obtained by reversing the voltage of the filter capacitor 2B is applied to the transformer 12. As a result, $v_{ab}$=−Vd/2, and a transition to a "−Vd/2" output is completed.

Operation in modes 7 to 10, which is the next half cycle, is the above-described operation in which the switching elements 7 and 8 are replaced with the switching elements 10 and 9, respectively, and the snubber capacitors 10a and 9a are replaced with the snubber capacitors 7a and 8a, respectively. Thus, in the operation, the transformer primary voltage vat makes a transition from "−Vd/2" to "+Vd/2", and the operation in one cycle is completed.

Consider the above operation. First, to achieve soft switching, it is necessary to satisfy a condition in formula (1) below.

$$(1/2)L_k \cdot i_{p1}^2 > C_{s1} \cdot (Vd/2)^2 \qquad (1)$$

In the above formula, $C_{s1}$ is the capacitances of the snubber capacitors 7a to 10a. Assume that the capacitances are equal among the snubber capacitors 7a to 10a.

By modifying formula (1) above, formula (2) below is obtained.

$$L_k > \{2 \cdot C_{a1} \cdot (Vd/2)^2\}/i_{p1}^2 \qquad (2)$$

In formula (2) above, Vd is regarded as almost constant, and $C_{s1}$ can be considered constant. Then, since the transformer primary current $i_p$ is proportional to the load current $i_o$, the condition can be expressed as in formula (3) below, using a proportionality constant K.

$$L_k > K/i_o^2 \qquad (3)$$

Figure 4:
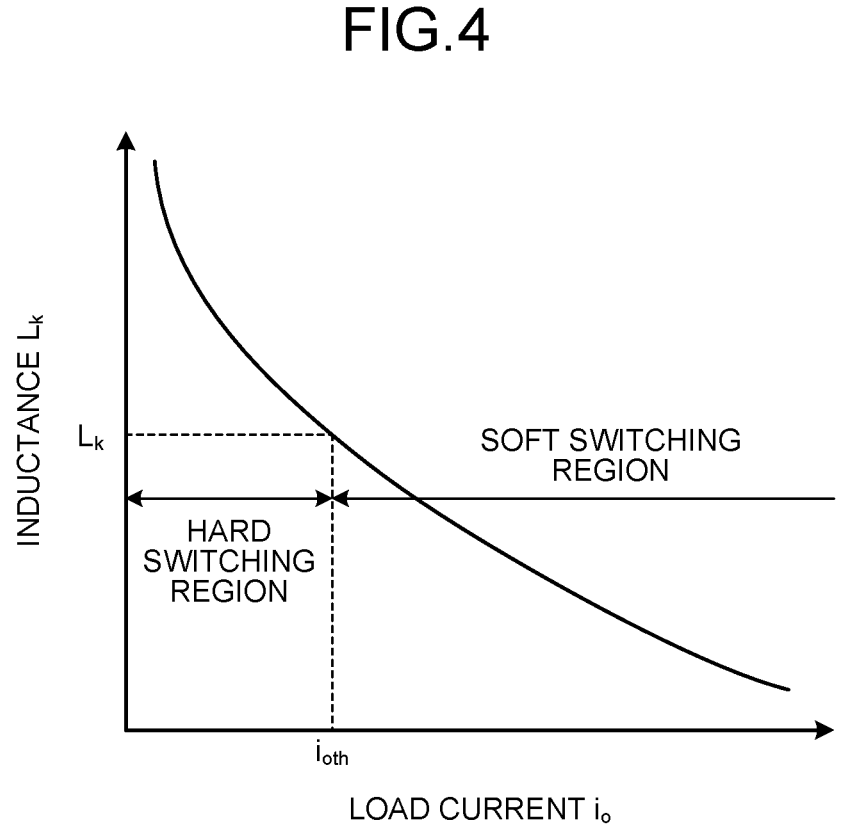
FIG. 4 is a diagram for explaining a condition for achieving soft switching.

Formula (3) above is represented on a graph as shown in FIG. 4. FIG. 4 is a diagram for explaining the condition for achieving soft switching.

The illustrated curve is provided where the left side and the right side in formula (3) above become equal to each other. With this curve as a boundary line, the lower side of the curve is a hard switching region, and the upper side of the curve is a soft switching region. As is well known, in the hard switching region, switching losses occur when the switching elements 7 to 10 are turned on or off. On the other hand, in the soft switching region, no switching losses occur. Thus, in the curve of FIG. 4, switching losses occur if the load current $i_o$ is equal to or lower than $i_{oth}$, where $i_{oth}$ is the current value of the load current $i_o$ corresponding to the inductance $L_k$.

To expand the soft switching region to a region where the load current $i_o$ is as low as possible, it is necessary to make the inductance $L_k$ the highest possible value. On the other hand, increasing the inductance $L_k$ increases the component of a voltage drop due to the inductance $L_k$ when the load current $i_o$ is high. This causes a problem of failure to obtain a sufficient inverter output voltage. That means a trade-off relationship between the prevention of switching losses and the inverter output voltage. This trade-off relationship conventionally prevents the inductance $L_k$ from being increased so much, which has been taken as a problem of failure to enlarge the soft switching region.

Figure 5:
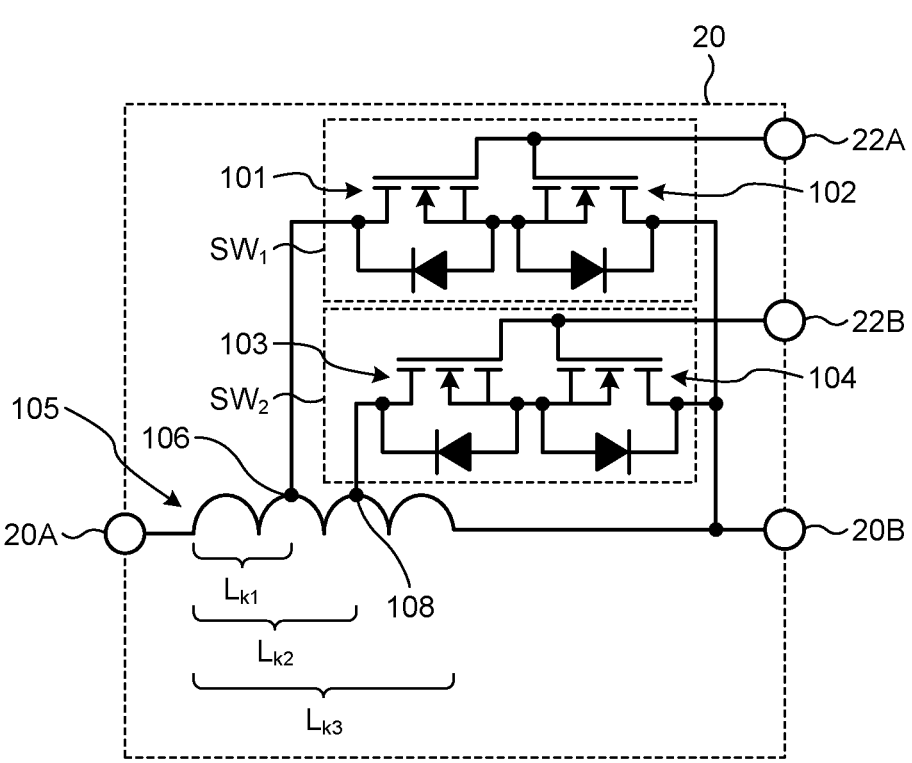
FIG. 5 is a diagram illustrating a detailed configuration example of a variable reactor according to the embodiment illustrated in FIG. 1.

Next, a configuration of a main part for solving the above problem will be described. FIG. 5 is a diagram illustrating a detailed configuration example of the variable reactor 20 according to the embodiment illustrated in FIG. 1. As illustrated in FIG. 5, the variable reactor 20 includes a reactor 105 and two bidirectional switches SW₁ and SW₂. The variable reactor 20 includes gate terminals 22A and 22B in addition to the first terminal 20M and the second terminal 20B. The reactor 105 has its one end side connected to the first terminal 20A, and the opposite end side connected to the second terminal 20B. The reactor 105 includes tap terminals 106 and 108.

The bidirectional switch SW₁ includes switching elements 101 and 102 including anti-parallel-connected diodes. The bidirectional switch SW₂ includes switching elements 103 and 104 including anti-parallel-connected diodes. The switching elements 101 and 102 are anti-series connected so that the anodes of the anti-parallel-connected diodes are in a face-to-face relation to each other. The switching elements 103 and 104 are likewise configured. Instead of this configuration, the switching elements can be anti-series connected so that the cathodes of the anti-parallel-connected diodes are in a face-to-face relation to each other.

One end of the bidirectional switch $SW_1$ is connected to the tap terminal 106, and the opposite end of the bidirectional switch $SW_1$ is connected to the second terminal 20B. The common gate of the bidirectional switch $SW_1$ is connected to the gate terminal 22A. When a gate signal is input to the gate terminal 22A, the bidirectional switch $SW_1$ comes into conduction. When the bidirectional switch $SW_1$ comes into conduction, the inductance value between the first terminal 20A and the second terminal 20B is changed from $L_{k3}$ to $L_{k1}$.

One end of the bidirectional switch $SW_2$ is connected to the tap terminal 108, and the opposite end of the bidirectional switch $SW_2$ is connected to the second terminal 20B. The common gate of the bidirectional switch $SW_2$ is connected to the gate terminal 22B. When a gate signal is input to the gate terminal 22B, the bidirectional switch $SW_2$ comes into conduction. When only the bidirectional switch $SW_2$ comes into conduction without the bidirectional switch $SW_1$ not being in conduction, the inductance value between the first terminal 20A and the second terminal 20B is changed from $L_{k3}$ to $L_{k2}$. The relationships among $L_{k1}$, $L_{k2}$, and $L_{k3}$ are $L_{k1} < L_{k2} < L_{k3}$. The inductance value between the first terminal 20A and the second terminal 20B is changed based on the current value of the load current $i_o$. The details of the control will be described later.

Figure 6:
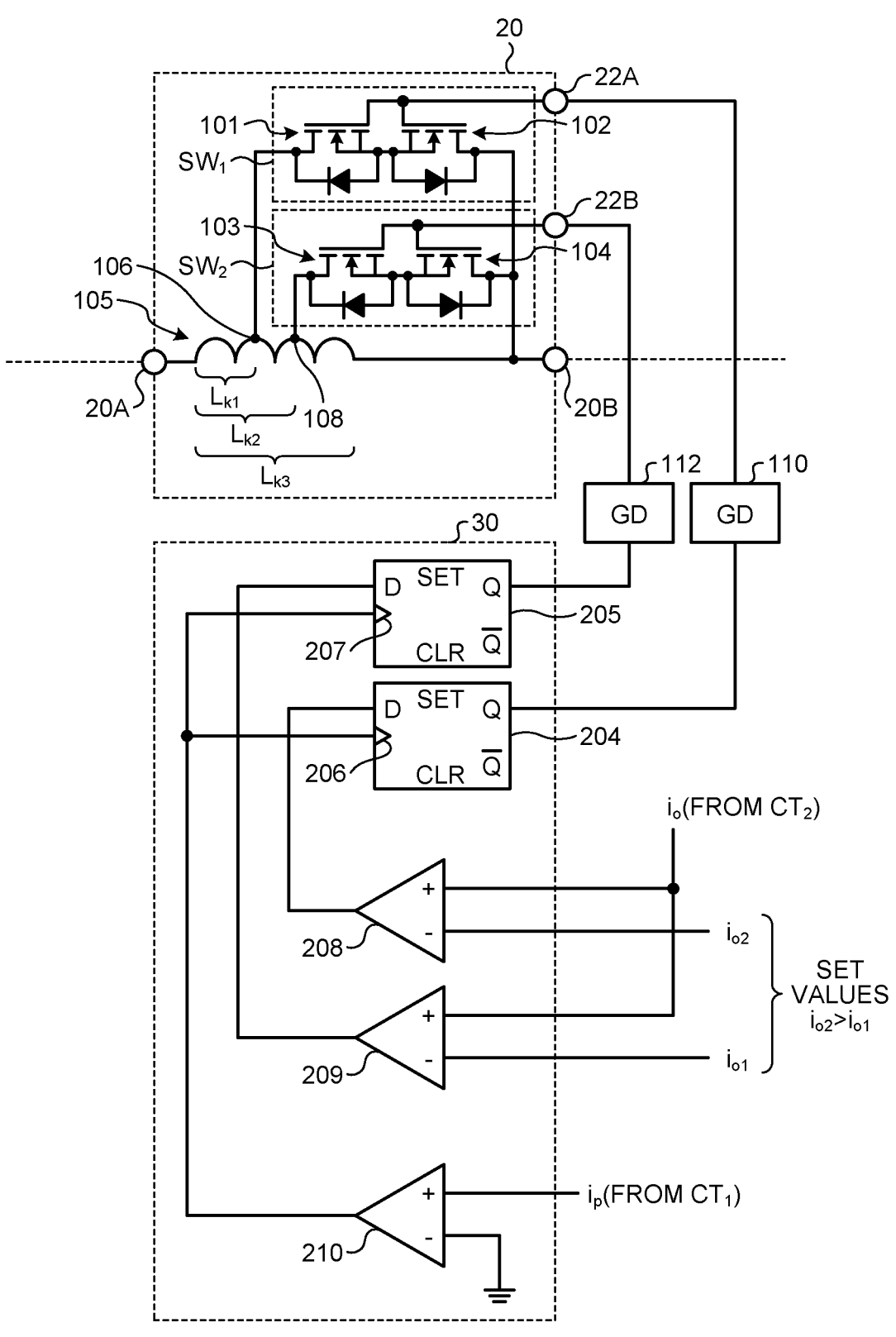
FIG. 6 is a diagram illustrating an example configuration of a control circuit for controlling the variable reactor illustrated in FIG. 5, together with the variable reactor.

FIG. 6 is a diagram illustrating an example configuration of a control circuit 30 for controlling the variable reactor 20 illustrated in FIG. 5, together with the variable reactor 20. As illustrated in FIG. 6, the control circuit 30 includes latch circuits 204 and 205 and comparators 208, 209, and 210. The latch circuits 204 and 205 each include a data input terminal D, a data output terminal Q, an inverted output terminal Q⁻ (Q bar), and a clock terminal 206 or 207. Note that the inverted output terminals Q⁻ are not used.

In this description, the comparators 208 and 209 are sometimes referred to as "first comparators", and the comparator 210 as a "second comparator".

In FIG. 6, a gate drive (GD) circuit 110 and a GD circuit 112 are present between the control circuit 30 and the variable reactor 20. The output of the GD circuit 110 is input to the gate terminal 22A. The output of the GD circuit 112 is input to the gate terminal 22B. The GD circuit 110 controls the conduction of the bidirectional switch $SW_1$ on the basis of the output of the latch circuit 204. The GD circuit 112 controls the conduction of the bidirectional switch $SW_2$ on the basis of the output of the latch circuit 205.

A detected value of the load current $i_o$ is input from the current sensor $CT_2$ to the positive terminals of the comparators 208 and 209. A set value $i_{o1}$ is input to the negative terminal of the comparator 209. A get value $i_{o2}$ is input to the negative terminal of the comparator 208. There is the relationship $i_{o2} > i_{o1}$ is between the set value $i_{o1}$ and the set value $i_{o2}$. A detected value of the transformer primary current $i_p$ is input from the current sensor $CT_1$ to the positive terminal of the comparator 210. A zero value, that is, "0" is input to the negative terminal of the comparator 210.

The output of the comparator 208 is input to the data input terminal D of the latch circuit 204. The output of the comparator 209 is input to the data input terminal D of the latch circuit 205. The output of the comparator 210 is input to the clock terminal 206 of the latch circuit 204 and the clock terminal 207 of the latch circuit 205.

Figure 7:
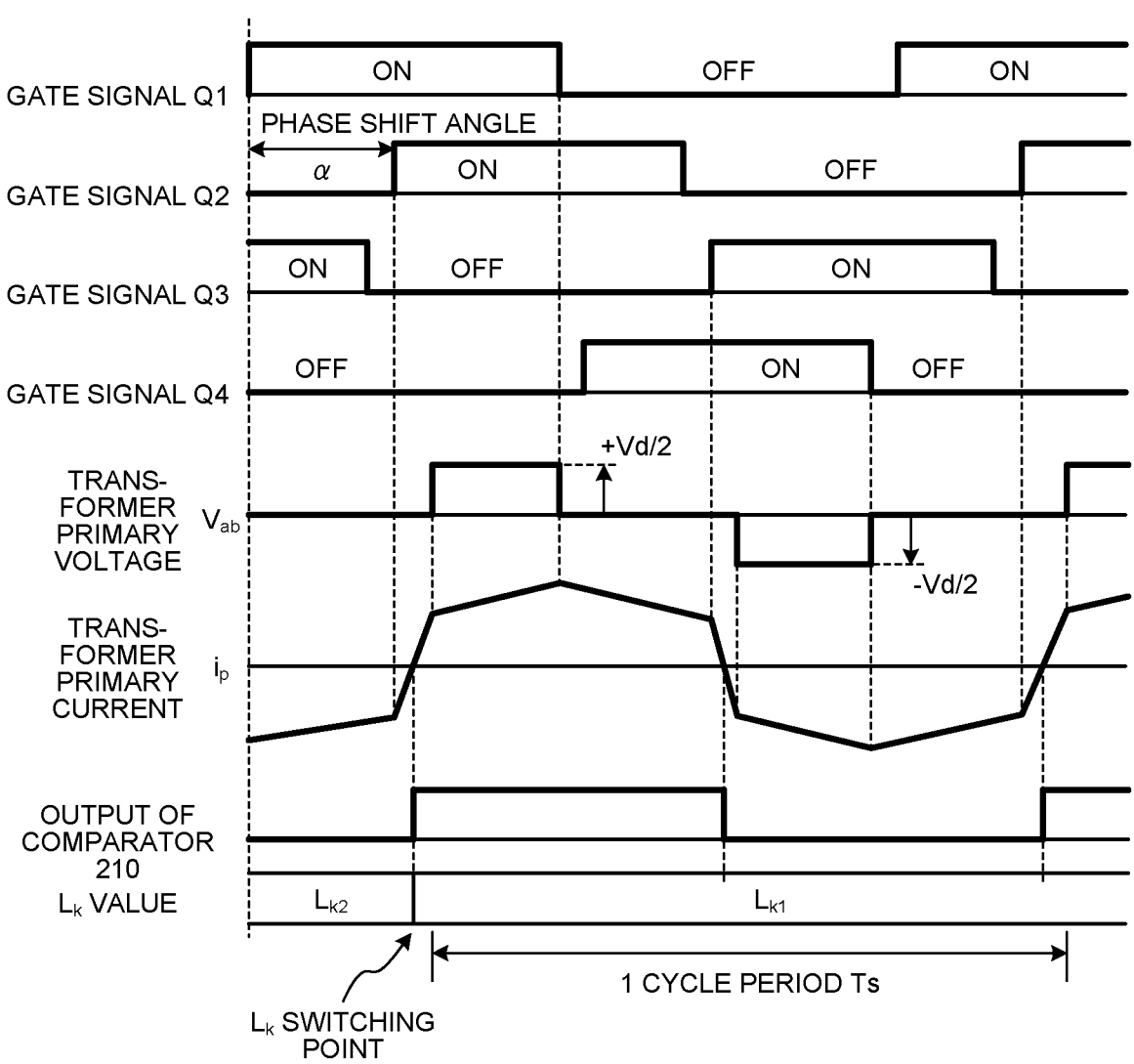
FIG. 7 is a timing chart for explaining the operation of the control circuit illustrated in FIG. 6.
Figure 8:
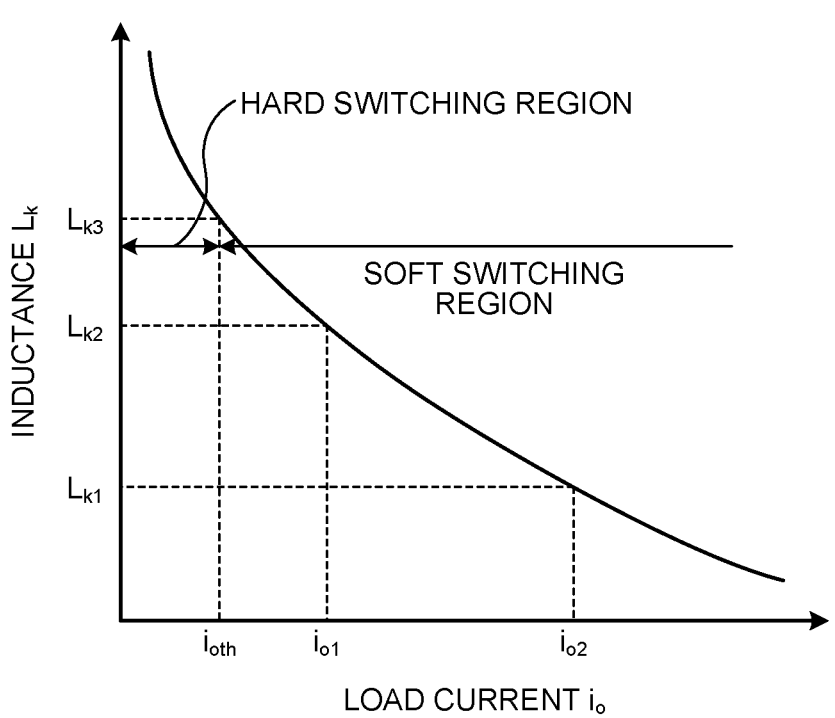
FIG. 8 is a diagram for explaining the effect of the power converter according to the embodiment.

Next, the operation of the control circuit 30 will be described with reference to FIGS. 7 and 8 in addition to FIG. 6. FIG. 7 is a timing chart for explaining the operation of the control circuit 30 illustrated in FIG. 6. FIG. 8 is a diagram for explaining the effect of the power converter 50 according to the embodiment.

The comparator 208 compares the load current is with the set value $i_{o2}$. When the load current $i_o$ is higher than the set value $i_{o2}$, a signal indicating logic "H" is output from the comparator 208 and held in the latch circuit 204. When the load current $i_o$ is equal to or lower than the set value $i_{o2}$, a signal indicating logic "L" is output from the comparator 208 and held in the latch circuit 204. Likewise, the comparator 209 compares the load current $i_o$ with the set value $i_{o1}$. When the load current $i_o$ is higher than the set value $i_{o3}$ a signal indicating logic "H" is output from the comparator 209 and held in the latch circuit 205. When the load current $i_o$ is equal to or lower than the set value $i_{o1}$, a signal indicating logic "L" is output from the comparator 209 and held in the latch circuit 205.

The comparator 210 compares the transformer primary current $i_p$ with the zero value. When the transformer primary current $i_p$ is higher than the zero value, a signal indicating logic "H" is output from the comparator 210 and input to each of the clock terminals 206 and 207 of the latch circuits 204 and 205. When the transformer primary current $i_p$ is equal to or lower than the zero value, a signal indicating logic "L" is output from the comparator 210 and input to each of the clock terminals 206 and 207 of the latch circuits 204 and 205.

The latch circuits 204 and 205 hold comparison signals output from the comparators 208 and 209, respectively. Then, the latch circuits 204 and 205 output the held signals from their corresponding data output terminals Q at the timing when the output of the comparator 210 changes from logic "L" to logic "H".

In this description, the outputs of the comparators 208 and 209 are sometimes referred to as "first comparison results", and the output of the comparator 210 as a "second comparison result".

In FIG. 7, waveforms of the gate signals Q1 to Q4, the transformer primary voltage $v_{ab}$, and the transformer primary current $i_p$ are the same as those illustrated in FIG. 2. FIG. 7 illustrates an output waveform of the comparator 210 and how the value of the inductance $L_k$ of the reactor 105 is changed. Specifically, FIG. 7 illustrates how the inductance $L_k$ is changed from $L_{k2}$ to $L_{k3}$. As illustrated in FIG. 7, the value of the inductance $L_k$ switches from $L_{k2}$ to $L_{k1}$ at the timing when the output of the comparator 210 changes from logic "L" to logic "H", that is, at a zero-crossing point where the transformer primary current $i_p$ switches from negative to positive. Note that as illustrated in the middle of the timing chart, the value of the inductance $L_k$ does not switch at the timing when the output of the comparator 210 changes from logic "H" to logic "L".

As described with reference to FIG. 4, the soft switching region depends on the load current $i_o$. When the load current $i_o$ is higher than the set value $i_{o2}$, both the outputs of the comparators 208 and 209 are logic "H", so that the bidirectional switches $SW_1$ and $SW_2$ come into conduction, and the value of the inductance $L_k$ becomes $L_{k1}$. This results in an operation in a region where the load current $i_o$ is higher than the set value $i_{o2}$, as illustrated in FIG. 8, although the value of $L_{k1}$ is relatively low. Accordingly, switching drive in the soft switching region is possible.

When the load current $i_o$ is equal to or lower than the set value $i_{o2}$, and the load current $i_o$ is higher than the set value $i_{o1}$, only the output of the comparator 209 becomes logic "H", so that only the bidirectional switch $SW_2$ comes into conduction, and the value of the inductance $L_k$ becomes $L_{k2}$. This operation can enlarge the soft switching region as also illustrated in FIG. 8.

FIG. 8 illustrates $i_{oth}$. $i_{oth}$ is the value of the load current $i_o$ corresponding to $L_{k3}$. $L_{k3}$ is the inductance value of the reactor 105, that is, the value of the inductance $L_k$ when both the bidirectional switches $SW_1$ and $SW_2$ are not in conduction. Thus, when the load current $i_o$ is equal to or higher than $i_{oth}$, switching drive in the soft switching region is possible. When the load current $i_o$ is less than $i_{oth}$, drive is performed in the hard switching region. As the value of the load current $i_o$ less than $i_{oth}$ is low, the transformer primary current $i_p$ becomes low, and the current flowing through the switching elements 7 to 10 becomes low as well. Consequently, the conduction losses of the switching elements 7 to 10 are small, and thus increases in the switching losses of the switching elements 7 to 10 do not become a problem.

The control circuit 30 in FIG. 6 is configured such that the inductance value is changed at a zero-crossing point where the transformer primary current $i_p$ switches from negative to positive, but the configuration of the control circuit is not limited to this example. The inductance value can be changed at a zero-crossing point where the transformer primary current $i_p$ switches from positive to negative.

Operation for starting the inverter circuit 60 or operation for driving the inverter circuit 60 from no load is opposite to that in the above description. The then operation will be described with reference to FIG. 8.

When the load current $i_o$ increases from zero, the operation starts from hard switching. At the point in time when the load current $i_o$ exceeds $i_{oth}$, the operation switches to soft switching. When the load current $i_0$ exceeds $i_{o1}$, the value of the inductance $L_k$ switches to $L_{k2}$. In a region where the load current $i_o$ is from $i_{oth}$ to $i_{o3}$, soft switching drive is possible. Further, when the load current $i_o$ exceeds $i_{o2}$, the value of the inductance $L_k$ switches to $L_{k1}$. Even in a region where the load current $i_o$ is from $i_{o3}$ to $i_{o2}$, soft switching drive is possible. This achieves the effect of obtaining a required inverter output voltage, maintaining soft switching drive.

When the control circuit 30 includes a microcomputer, the value of the proportionality constant K in formula (3) above is recalculated to thereby change the values of the set values $i_{o1}$ and $i_{o2}$. Even when the characteristics of the load 19 wary, thus, the control circuit 30 is applicable to the power converter 50 without being changed in design.

Although FIG. 6 illustrates the configuration example in which the value of the inductance $L_k$ is changed in three stages, $L_{k1}$ $L_{k2}$, and $L_{k3}$, the present invention is not limited to this example. The value of the inductance $L_k$ may be changed in two stages, or the value of the inductance $L_k$ may be changed in four or more stages. This can be done by changing, in accordance with the number of change stages, the number of the tap terminals 106 and 108 provided to the reactor 105, the numbers of the latch circuits 204 and 205 and the comparators 208 and 209 in the control circuit 30, and the corresponding number of the GD circuits 110 and 112.

It is conceivable that a saturable reactor is used as another method for making the value of the inductance $L_k$ variable. However, it is difficult to maintain proper characteristics by using a saturable reactor in view of the use environment of the power converter 50, aging, etc. In addition, a problem with a saturable reactor is that an expandable soft switching region is narrow. Furthermore, a saturable reactor suffers from a problem of leading to increases in dimensions and weight, etc., and hence it is difficult to make the value of the inductance $L_k$ variable using the saturable reactor. By contrast, the method of the embodiment, which can enlarge the soft switching region by the electrical method, can thus prevent increases in dimensions and weight. In addition, since the values of the set values $i_{o3}$ and $i_{o2}$ can be changed by a processor such as a microcomputer, the problems of the use environment, aging, etc. can be solved.

When the value of the inductance $L_k$ is changed, the characteristics on the load side as viewed from the inverter circuit 60 change. In this regard, the method of the embodiment, in which the value of the inductance $L_k$ is changed at the timing when the transformer primary current $i_p$ becomes zero, thus can reduce the effect of change of the load-side characteristics on the inverter circuit 60. Thus, even the configuration that discretely changes the inductance $L_k$ can obtain an effect equivalent to that of a configuration that continuously changes the inductance $L_k$.

The power converter 50 and its technology according to the embodiment can be applied to various power supply apparatuses, and are particularly suitable for use in a power supply apparatus that supplies power to an auxiliary load installed in a railway vehicle. The auxiliary load is a name referring to a load other than a main motor among loads installed in the railway vehicle. Examples of the auxiliary load include an air conditioner, a vehicle interior lighting device, a door opening and closing device, a safety device, a compressor, a battery, and a control power supply. The compressor is a device that generates an air source for a vehicle brake.

For a power supply apparatus used in a railway vehicle, the load current $i_o$ increases because the load of an air conditioner increases when train operation starts or when a passenger load factor is high in the hot summer season. On the other hand, as cooling in the vehicle proceeds, the load current $i_o$ decreases. The time during which the load current $i_o$ is high is short, and the time during which the load current $i_o$ is low is long. When the power supply apparatus is applied to, for example, a railway vehicle, it is required to improve efficiency at low load at which operating time is long as well as achieving high power supply capacity. Thus, the power converter according to the present embodiment that can reduce losses at low load is suitable as a power supply apparatus for a railway vehicle.

A train made up of a plurality of railway vehicles includes a train information management system that manages train information. The train information management system can determine the operating condition of an auxiliary load on the basis of the train information, and can control the operation of the auxiliary load. Thus, the train information management system can determine whether the operating condition of the auxiliary load is low load or high load. Using this function, the value of the inductance $L_k$ in the variable reactor 20 can be changed on the basis of load information that is information about the operating condition of the auxiliary load. This can simplify the configuration of the control circuit 30. To change the value of the inductance $L_k$ with high precision, attention should be paid to outputting a signal to change the value of the inductance $L_k$ at a transmission timing synchronized with, for example, the timing of transmitting a control signal to the air conditioner, etc.

When the operating conditions of the auxiliary load are classified into two categories, low load and high load, the variable reactor 20 is only required to include any one of the bidirectional switches $SW_1$ and $SW_2$.

When the operating conditions of the auxiliary load are classified into three categories, low load, medium load, and high load, and the value of the inductance $L_k$ is changed according to the three categories, the variable reactor 20 having the configuration illustrated in FIG. 6 can be used. The control circuit 30 illustrated in FIG. 6 can use the functions of the comparator 210 and the latch circuits 204 and 205.

For example, the control circuit 30 can be configured such that the latch circuit 204 outputs a signal to bring the bidirectional switch SW$_1$ into conduction when the operating condition of the auxiliary load is high load. The control circuit 30 can be configured such that the latch circuit 205 outputs a signal to bring only the bidirectional switch SW$_2$ into conduction when the operating condition of the auxiliary load is medium load. The control circuit 30 can be configured such that neither of the bidirectional switches SW$_1$ and SW$_2$ is in conduction when the operating condition of the auxiliary load is low load.

As described above, the power converter according to the embodiment includes the variable reactor disposed on the output side of the inverter circuit and configured to be variable in inductance value. By using the variable reactor, the inductance value between the inverter circuit and primary winding of the transformer can be changed, on the basis of the load current. Consequently, the power conversion efficiency can be further improved.

The power converter according to the embodiment includes the control circuit that changes the inductance value of the variable reactor in two or more stages. On the basis of the load current flowing through the load, the control circuit performs the control for changing the inductance value. The variable reactor according to the embodiment includes the reactor having the first terminal connected to the inverter circuit and the second terminal connected to the primary winding of the transformer, and includes the one or more bidirectional switches including the two anti-series-connected switching elements including the anti-parallel-connected diodes. The one or more bidirectional switches each have its one end connected to the first terminal or the second terminal, and the opposite end connected to the corresponding one of the different tap terminals of the variable reactor. By using the control circuit and the variable reactor configured as described above, the inductance value between the inverter circuit and the primary winding of the transformer can be changed in two or more stages. This enables the provision of a required inverter output voltage, maintaining soft switching drive.

It is preferable to change the inductance value of the variable reactor according to the embodiment at a zero-crossing point where the value of the transformer primary current switches from negative to positive or from positive to negative. This can reduce the effect of change of the load-side characteristics on the inverter circuit. Thus, even the configuration that discretely changes the inductance value can obtain an effect equivalent to that of a configuration that continuously changes the inductance value.

The control circuit according to the embodiment can include the same number of the first comparators as the number of the bidirectional switches, the same number of the latch circuits as the number of the first comparators, and the second comparator that outputs the second comparison result obtained by comparing the primary current with the zero value. Each of the first comparators outputs the first comparison result obtained by comparing the load current with the predetermined set value. Each of the latch circuits receives input of the first comparison result from the corresponding first comparator, and the second comparison result from the second comparator. Each of the latch circuits holds the first comparison result. Each of the latch circuits outputs a signal based on the first comparison result to the corresponding bidirectional switch in accordance with the timing at which the second comparison result is input. Using the control circuit thus configured enables proper change of the inductance value in the variable reactor.

The power converter according to the embodiment can be configured as a power supply apparatus installed in a railway vehicle or a train. The power converter according to the embodiment can reduce losses at low load. For this reason, the power converter can be suitably used in a railway vehicle or a train that requires improved efficiency at low load at which operating time is long as well as achieving high power supply capacity.

The power converter according to the embodiment can be configured as a power supply apparatus installed in a train including a train information management system that manages train information. The power converter includes the control circuit that changes the inductance value of the variable reactor in two or more stages. The control circuit performs the control for changing the inductance value, on the basis of load information output from the train information management system. The power supply apparatus thus configured provides the effect of simplifying the configuration of the control circuit.

The configuration described in the above embodiment illustrates an example, and can be combined with another known art, and can be partly omitted or changed without departing from the gist.

For example, the inverter circuit 60 illustrated in FIG. 1 has the three-level circuit configuration, but is not limited to this. The inverter circuit 60 can have a two-level circuit configuration. The inverter circuit 60 illustrated in FIG. 1 has the half-bridge circuit configuration, but is not limited to this. The inverter circuit 60 can have a single-phase bridge circuit configuration. The converter circuit 70 illustrated in FIG. 1 uses the rectifier circuit 72 having the four diodes connected in the full bridge, but is not limited to this. Instead of the rectifier circuit 72, an AC-DC conversion circuit including at least one switching element can be used.

REFERENCE SIGNS LIST

1 DC power supply; 2A, 2B filter capacitor; 3A high-potential line; 38 intermediate-potential line; 3C low-potential line; 4A, 4B AC wire; 5A, 5B clamp diode; 6 flying capacitor; 7, 8, 9, 10, 101, 102, 103, 104 switching element; 7a, 8a, 9a, 10a snubber capacitor; 12 transformer; 13, 14, 15, 16 diode; 17 smoothing reactor, 18 output filter capacitor; 19 load; 20 variable reactor; 20A first terminal; 208 second terminal; 22A, 228 gate terminal; 30 control circuit; 50 power converter; 60 inverter circuit; 62 input capacitor circuit; 64 inverter main circuit; 70 converter circuit; 72 rectifier circuit; 74 output filter circuit; 105 reactor; 106, 108 tap terminal; 110, 112 GD circuit; 204, 205 latch circuit; 206, 207 clock terminal; 208, 209, 210 comparator; CT$_1$, CT$_2$ current sensor; SW$_1$ SW$_2$ bidirectional switch; W$_1$ primary winding; W$_2$ secondary winding.

The invention claimed is:

1. A power converter to convert a first DC voltage applied from a DC power supply into a second DC voltage for a load, the power converter comprising:

an inverter circuit including a plurality of switching elements and snubber capacitors each connected in parallel to a corresponding one of the plurality of switching elements, and a plurality of clamping diodes and at least one flying capacitor connected to the plurality of switching elements, the inverter circuit configured to convert the first DC voltage into a first AC voltage and to discharge charges accumulated in the snubber capacitors by the at least one flying capacitor;

a variable reactor disposed on an output side of the inverter circuit and configured to be variable in inductance value;

a transformer including a primary winding and a secondary winding that are magnetically coupled to each other to insulate a primary side and a secondary side from each other, to convert the first AC voltage applied via the variable reactor, into a second AC voltage;

a converter circuit to convert the second AC voltage into the second DC voltage; and a control circuit to change the inductance value of the variable reactor in two or more stages, wherein the control circuit changes the inductance value based on a load current flowing through the load, the inductance value is changed at a zero-crossing point where a primary current flowing through the primary winding switches from negative to positive or from positive to negative, and the variable reactor includes:

a reactor including first and second terminals and one or more tap terminals, the first terminal being connected to the inverter circuit, the second terminal being connected to the primary winding of the transformer, one or more bidirectional switches each including two switching elements including antiparallel-connected diodes, the two switching element being anti-series connected to each other, and the one or more bidirectional switches each have one end connected to the first terminal or the second terminal, and an opposite end connected to a corresponding one of the one or more tap terminals.

2. The power converter according to claim 1, wherein the control circuit includes a same number of first comparators as a number of the one or more bidirectional switches, to output first comparison results obtained by comparing the load current with predetermined set values, a second comparator to output a second comparison result obtained by comparing the primary current with a zero value, and a same number of latch circuits as the number of the first comparators, to receive input of the first comparison results from the corresponding first comparators, and the second comparison result from the second comparator, and the latch circuits each hold a corresponding one of the first comparison results and output a signal based on the held first comparison result to a corresponding one of the one or more bidirectional switches in accordance with a timing at which the second comparison result is input.

3. A power supply apparatus to be installed in a railway vehicle, the power supply apparatus comprising the power converter according to claim 2, wherein the power supply apparatus supplies power to an installed load in the railway vehicle, using the power converter.

4. A power supply apparatus to be installed in a railway vehicle, the power supply apparatus comprising the power converter according to claim 1, wherein the power supply apparatus supplies power to an installed load in the railway vehicle, using the power converter.

5. A power supply apparatus to be installed in a train including a train information management system to manage train information, the power supply apparatus comprising the power converter according to claim 1, wherein the power supply apparatus supplies power to a load installed in the train, using the power converter, and the control circuit changes the inductance value on based on load information output from the train information management system.

* * * * *